US005949050A

United States Patent [19]

Fosbenner et al.

[11] Patent Number: 5,949,050

[45] Date of Patent: Sep. 7, 1999

[54] MAGNETIC CARDS HAVING A LAYER BEING PERMANENTLY MAGNETIZED IN A FIXED CONFIGURATION

[75] Inventors: Mary Ellen G. Fosbenner, Riverton, N.J.; Truman John Gilbert, Philadelphia, Pa.; Robert J. Henry, Riverside, N.J.; Joseph Leonelli, Cherry Hill, N.J.; Peter Santaw, Moorestown, N.J.; Howard Wodin, Woodbury, N.J.

[73] Assignee: Mattel, Inc., El Segundo, Calif.

[21] Appl. No.: 08/788,876

[22] Filed: Jan. 22, 1997

[51] Int. Cl.$^{6}$ ...................................................... G06K 7/08

[52] U.S. Cl. .......................... 235/449; 235/493; 235/494; 283/85; 273/293; 434/190; 434/409

[58] Field of Search .................................... 235/449, 493, 235/494; 283/85, 82, 83, 111; 273/239, 293, 295, 443, 456; 434/73, 190 V, 192, 409 V, 410, 168

[56] References Cited

U.S. PATENT DOCUMENTS

| | | | |
|---|---|---|---|
| 3,245,697 | 4/1966 | Aucun | 283/7 |
| 4,143,472 | 3/1979 | Murata et al. | 35/66 |
| 4,242,823 | 1/1981 | Bruno | 40/651 |
| 4,671,515 | 6/1987 | Burgess | 273/293 |
| 4,861,031 | 8/1989 | Simms | 273/85 |
| 4,927,748 | 5/1990 | Kinberg | 434/410 |
| 5,151,032 | 9/1992 | Igawa | 434/409 |
| 5,295,342 | 3/1994 | Roche et al. | 52/764 |
| 5,424,523 | 6/1995 | Ohno et al. | 235/449 |
| 5,699,956 | 12/1997 | Brennan | 229/92.8 |
| 5,740,557 | 4/1998 | Reid et al. | 2/209.13 |

FOREIGN PATENT DOCUMENTS

| | | |
|---|---|---|
| 270812 | 6/1988 | European Pat. Off. . |
| 310707 | 4/1989 | European Pat. Off. . |
| 2372476 | 6/1978 | France . |

OTHER PUBLICATIONS

Catalog, Tyco Industries, Inc., Mt. Laurel, NJ, 1990, month is required, cover and pp. 132–136.
Catalog, Tyco Industries, Inc., Mt. Laurel, NJ, 1991, month is required, cover and pp. 144, 146 and 147.
Catalog, Tyco Industries, Inc., Mt. Laurel, NJ, 1992, month is required, cover and pp. 154, 156 and 157.
Catalog, Tyco Industries, Inc., Mt. Laurel, NJ, 1993, month is required, cover and pp. 156, 157 and 163.
Catalog, Tyco Industries, Inc., Mt. Laurel, NJ, Spring, 1994, month is required, cover and pp. 118, 119, 121 and 125.
Catalog, Tyco Industries, Inc., Mt. Laurel, NJ, 1995, month is required, cover and p. 89.

*Primary Examiner*—Donald Hajec
*Assistant Examiner*—Daniel St. Cyr
*Attorney, Agent, or Firm*—Panitch Schwarze Jacobs & Nadel, P.C.

[57] ABSTRACT

Magnetic cards are formed by plural, coadjoining, generally planar, parallel layers. Outermost layers form outer sides of each card. At least a first visible image is provided on a first of the outer sides. The card includes a generally planar, permanently magnetized layer formed by one or more permanently magnetizable planar components that are fixedly positioned preferably within a frame between the opaque outer sides or a magnetizable material layer only -part of which has been selectively permanently magnetized. The permanently magnetized layer or permanently magnetized portion of a larger, magnetizable layer has a predetermined configuration which is related at least in informational content to the first visible image. A silhouette of the predetermined configuration can be magnetically reproduced by placing a card on a magnetically actuated fluid display panel. The permanently magnetized component(s) or magnetized portion(s) of the permanently magnetizable layer generates an image on the panel which has a silhouette identical in configuration to that of the permanently magnetized component(s) or portion(s). Two magnetic layers and two images on opposite outer sides of each card can be provided as well as visible images formed by depressions into the outer surface or cut-outs completely through a card.

36 Claims, 10 Drawing Sheets

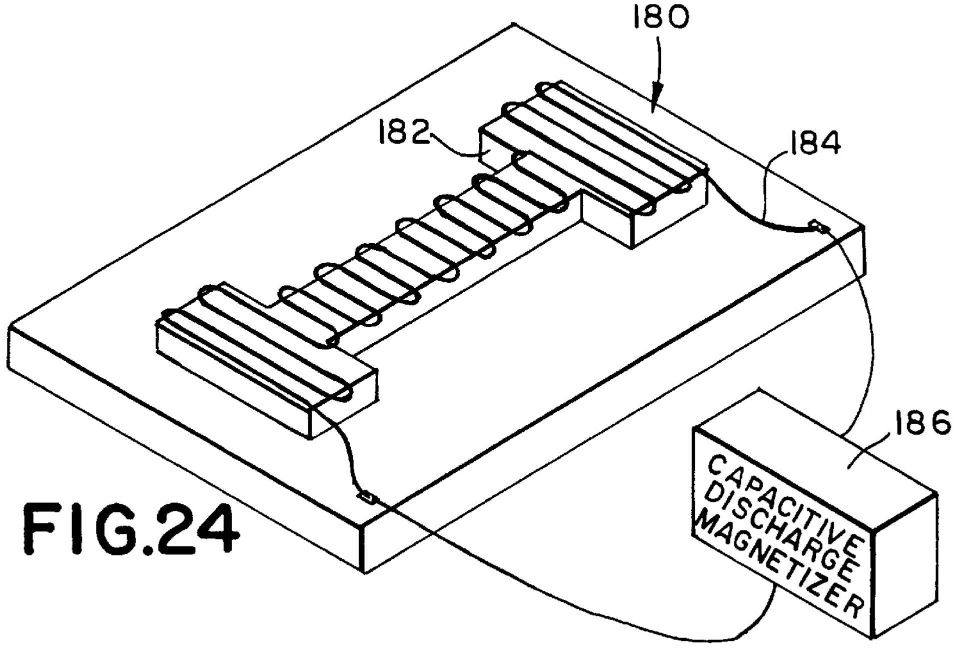
FIG.24
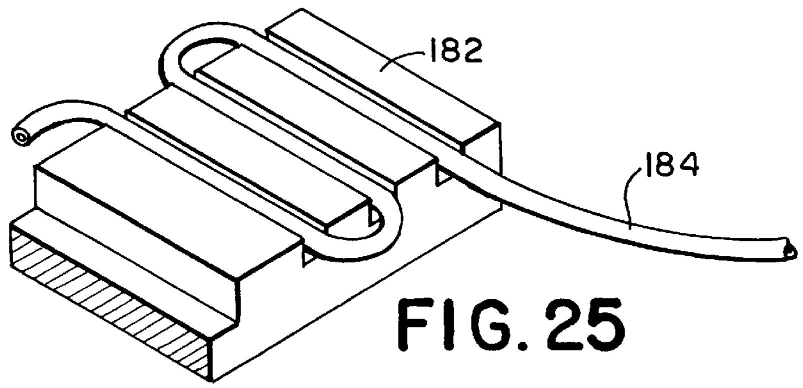
FIG. 25
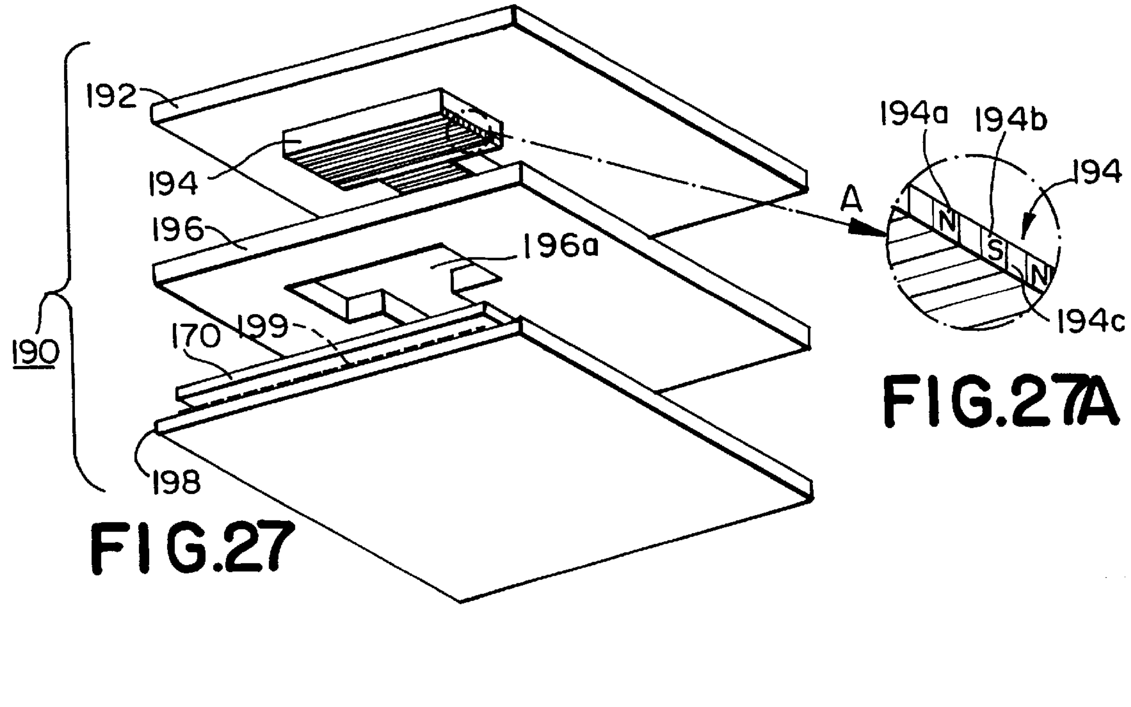
FIG.27
FIG.27A

MAGNETIC CARDS HAVING A LAYER BEING PERMANENTLY MAGNETIZED IN A FIXED CONFIGURATION

BACKGROUND OF THE INVENTION

The present invention relates to magnetic cards usable with toy magnetically actuated, fluid display devices.

U.S. Pat. Nos. 4,143,472 and 5,151,032 describe aspects of a magnetically actuated, fluid display device typically distributed as a toy. The device includes a pair of planar parallel substrates spaced apart from one another by an open matrix spacer defining a multiplicity of adjoining cells. The cells are filled with a liquid dispersion comprising magnetic particles in a liquid dispersion medium. The dispersion medium has a viscosity sufficient to normally suspend the magnetic particles in a fixed position. The particles can be moved by a sufficiently strong, externally applied magnetic field. The toy is typically provided with a quill having a permanent magnet tip that draws the magnetic particles to one of the panels against which the quill tip is applied. By providing contrasting colors to the magnetic particles and the dispersion medium, the particles drawn to the surface of the substrate change the color of the cell, thereby creating a visible image on the face or "screen" of the display device.

A number of accessories have been proposed thus far for use with such magnetic fluid display devices. Magnetic "stamps" in various shapes (e.g. large solid circle, large hollow tube, other geometric shapes, etc.), have been provided with handles to easily reproduce individual images of such shapes on the display. Also, conventional stencils having open slots, which permit the magnetic tip of the quill to contact the surface of the display, can be used to assist in making shapes.

It would be desirable to provide other accessories for use with the magnetic board, particularly educational accessories, to add to the entertainment, enjoyment and learning of users who already own such boards and to make such boards more versatile and therefore more desirable to potential purchasers.

BRIEF SUMMARY OF THE INVENTION

In one aspect, the invention is an integral magnetic imaging card comprising: a pair of opposing major outer sides; a first visible image of fixed, predetermined configuration on a first of the pair of opposing major outer sides; and a core underlying at least the first major side, the core including at least a first layer of magnetic material, the first layer having a pair of opposing major sides, and being permanently magnetized in a fixed predetermined configuration, the configuration having a magnetically reproducible, other than rectangular silhouette related at least in informational content to the configuration of the first visible image.

In another aspect, the invention is an integral magnetic card comprising a plurality of coadjoining generally planar layers, at least one of the plurality of layers being a first layer, at least part of the first layer being permanently magnetized material, at least one of the plurality of layers being opaque and overlying a major side of the first layer and being exposed to view on a first major outer side of the magnetic card, at least one of the plurality of layers bearing a first image visible on the first major outer side of the magnetic card, and the permanently magnetized part of the first layer having a configuration with a magnetically reproducible, other than rectangular silhouette different in appearance from the first visible image yet related at least in informational content to the configuration of the first visible image.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, which are diagrammatic:

FIG. 24 is a diagrammatic perspective view of an electromagnetic fixture;

FIG. 25 is a partial detail of FIG. 24;

FIG. 27 is a perspective schematic of a third selective magnetization apparatus;

FIG. 27A is an expanded view of area "A" of FIG. 27; and

DETAILED DESCRIPTION OF THE INVENTION

Figure 1:
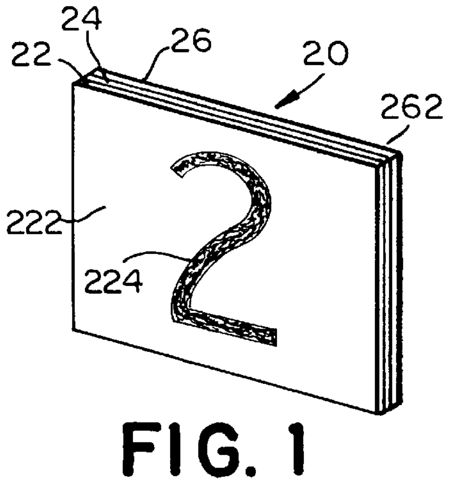
FIG. 1 is a perspective view of a first major planar side of a first exemplary embodiment magnetic card according to the present invention.

Certain terminology is used in the following description for convenience only and is not intended to be limiting. The words "right", "left", "lower" and "upper" designate directions in the drawings to which reference is made. The words "radial" and "axial" refer to directions perpendicular to and along the central axis of an object, element or structure referred to. The words "inwardly" and "outwardly" refer to directions towards and away from, respectively, the geometric center of the object, element or structure. The terminology includes the words above specifically mentioned, derivatives thereof and words of similar import. Moreover, throughout the drawings, like numerals are used to indicate like elements.

FIG. 1 is a perspective view of a first of a pair of major planar outer sides of a first magnetic card 20 according to the present invention. The card 20 is formed by a plurality of coadjoining at least generally planar parallel layers 22, 24 and 26, respectively. The outer two layers 22 and 26 preferably define the pair of opposing major planar opaque outer sides 222 and 262, respectively, of the card 20, only the first side 222 being visible in FIG. 1. The first side 222 bears a first visible image 224 of a preferably fixed, predetermined configuration. In this case, the first visible image 224 is the numeral 2. The second side 26 may be blank.

Figure 2:
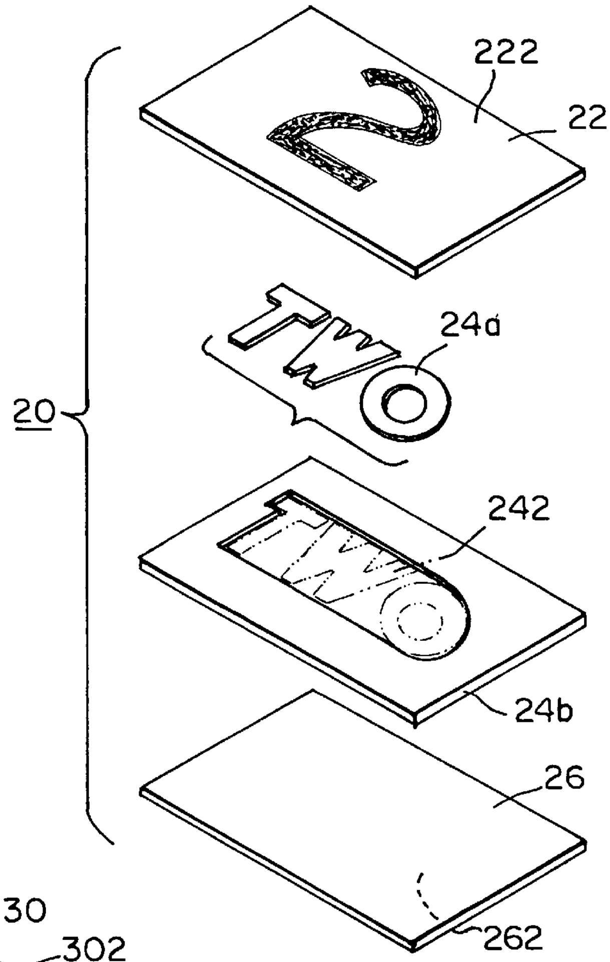
FIG. 2 is an exploded view of one possible configuration of card of FIG. 1.

FIG. 2 is an exploded view of an exemplary construction of the card 20 of FIG. 1. Located within the card 20, covered by the pair of opaque outer sides 222 and 262 and outer layers 22 and 26, is a core 24 which at least includes a first, at least generally planar permanent magnet layer 24*a*. The first magnet layer 24*a* preferably has an other than solid rectangular, fixed, predetermined, physical configuration. In this particular embodiment, the first magnet layer 24*a* is defined preferably by three separate planar components or elements, namely three planar letters, T, W, and O arranged to spell the word TWO. A generally planar frame 24*b* preferably is provided between the layers 22 and 26, which define the pair of opaque outer sides 222 and 262, and around the magnet layer 24*a*. Preferably, the spacer 24*b* and first magnet layer 24*a* are at least essentially coplanar and together they define the intermediate layer 24, which is the core of the card 20. The outer perimeter of the frame 24*b* defines the edge of layer 24 seen on the edges of the card 20.

The frame 24*b* is provided primarily to receive and preferably conceal and retain in a fixed, predetermined position, the elements defining the first magnet layer 24*a*. To that end, the frame 24*b* is preferably provided with at least one internal opening 242, which is configured to receive at least a portion of the first magnet layer 24*a*. Each component of the magnet layer 24*a* may be held in place by interfitting with a portion or portions of the inner perimeter 244 of the internal opening 242 or with other components or both. In FIG. 2, the letters T, W and O are shown in phantom in the position in which they would be received in the internal opening 242 of the frame 24*b*.

Frame 24*b* can also serve as the main structural component of the card 20, giving the card 20 its strength and rigidity. Frame 24*b* preferably may be made of cardboard but polymer or any other appropriate, inexpensive and sufficiently rigid stock or sheet material might be used. The outer layers 22 and 26 may be formed from paper or thicker stock like cardboard or polymer film or other suitable stock or sheet material. The elements forming the magnet layer 24*a* may be cut or stamped or possibly molded from permanently magnetized polymer sheet. All of the foregoing are available from a variety of manufacturers both within and outside of the United States. The various layers can be held together in various ways, preferably by being laminated or otherwise heat bonded or joined by adhesive(s). They could also be held together by any of a wide variety of mechanical fasteners or fastenings, either separate fasteners or fasteners formed as parts of the card layers or members.

Figure 3:
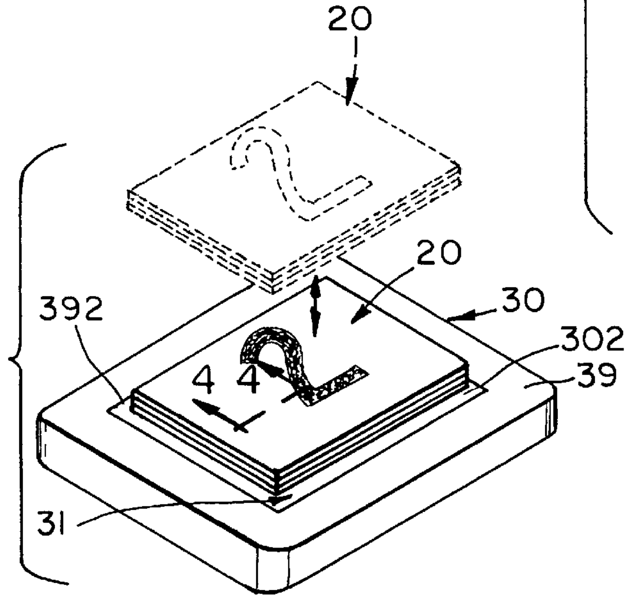
FIG. 3 depicts the placement of the card of FIGS. 1 and 2 on a magnetically actuated fluid display device.
Figure 4:
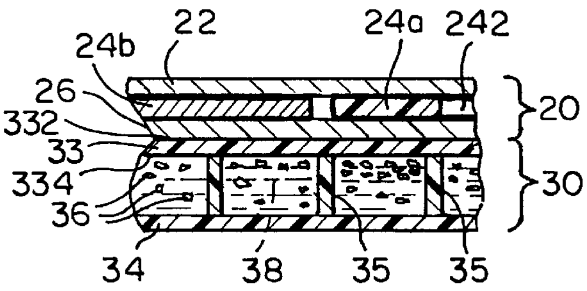
FIG. 4 is a cross-sectional elevation through the card and the display device at their interface along lines 4—4 in FIG. 3.

FIG. 3 shows the magnetic card 20 of FIGS. 1–2 with an exemplary, magnetically actuated, fluid display device or simply "magnetic display device" indicated generally at 30. FIG. 4 is a broken-away view of the magnetic display device 30 of FIG. 3 with the magnetic card 20 applied. The heart of the magnetic display device 30 is a panel 31 comprising a pair of spaced apart planar sheets 33 and 34 and a plurality of magnetically attracted particles 36 suspended in a fluid carrier 38 between the sheets 33 and 34. The sheets 33, 34 particles 36 and fluid 38 are joined together and the resulting panel 31 is typically mounted in a housing 39. A matrix 35 may be provided as a separate member between sheets 33 and 34 or formed on an inner side of one of the sheets to define cells in the panel to restrict lateral movement of particles 36 and fluid 38.

Preferably, the housing 39 has an opening 392 through its upper side exposing the upper side 332 of sheet 33 of panel 31. A "view screen" 32 of device 30 is provided by the upper outer side 332 of the upper sheet 33 exposed by the housing opening 392. The card 20 preferably is sized to fit within the margins of the housing opening 392 surrounding and defining the perimeter of the "screen" 32, so that the card rests directly against the exposed upper side 332 of sheet 33. The magnet layer 24*a* of card 20 has a magnetic field strength effective to penetrate the intervening planar layer 26 of the card 20, the adjoining, upper planar sheet 33 of the panel 31 and into the fluid 38 sufficiently and to attract and move particles 36 in the panel cells directly opposite the component(s) of the first magnet layer 24*a* to the inner side 334 of the upper planar sheet 33 of panel 31 when card 20 is positioned against the exposed upper side 332 of that sheet. Further details regarding such display panels 31 can be found in U.S. Pat. Nos. 4,143,472 and 5,151,032, incorporated by reference herein in their entireties.

Figure 5:
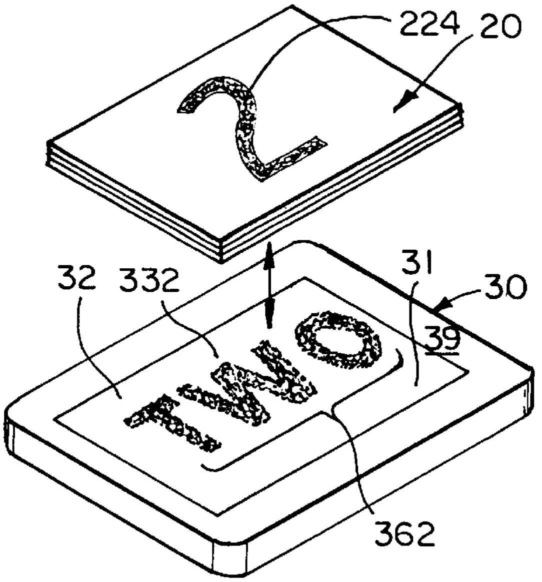
FIG. 5 depicts the altered state of the display device after the magnetic card has been placed on and removed from the upper surface of the display device.

Referring to FIG. 5, when the magnetic card 20 is removed from the view screen 32, the attracted particles 36 remain suspended adjoining the lower, inner side 334 of the upper planar sheet 33, which is transparent, and form a first magnetically generated visual image 362 seen on the screen 32 of panel 31. That visual image 362 is generally identical in configuration to the configuration and, in particular, the silhouette of the magnet layer 24*a*. In the case of card 20, the silhouette formed on screen 32 is a magnetically reproduced copy of the predetermined physical configuration of each of its three component letters T, W and O positioned to spell TWO and is identical to the silhouette of those permanently magnetized components defining the first magnet layer 24*a*.

It will be appreciated that although the silhouette and physical configuration of the magnet layer 24*a*, namely the word TWO, is not identical to the first visible image 224 or its configuration, namely the numeral 2, the fixed, predetermined physical configuration of the first magnet layer 24*a* in the card 20 is related to and indeed is equivalent in both content and meaning to the numeral 2 constituting the first visible image 224 but is expressed in a different form.

The card 20 can be used with a device 30 to teach a relationship between the first visible image 224 and the magnetically generated image 362, which is identical to the configuration of the first magnet layer 24*a* of card 20.

The remaining major planar opaque outer side 262 of the card 20 could be left blank. Where the card 20 contains only a single magnet layer, it may be preferred to have the remaining side 262 blank so it is clear to a child or other user which major side of the card is placed on the panel 31 to obtain the proper orientation of the visual image 362 formed in the screen 32. In some instances it is possible to use a magnet layer generating a visible image on the magnet display panel 31, which does not have a particular left-right orientation, as is done in FIG. 6.

Figure 6:
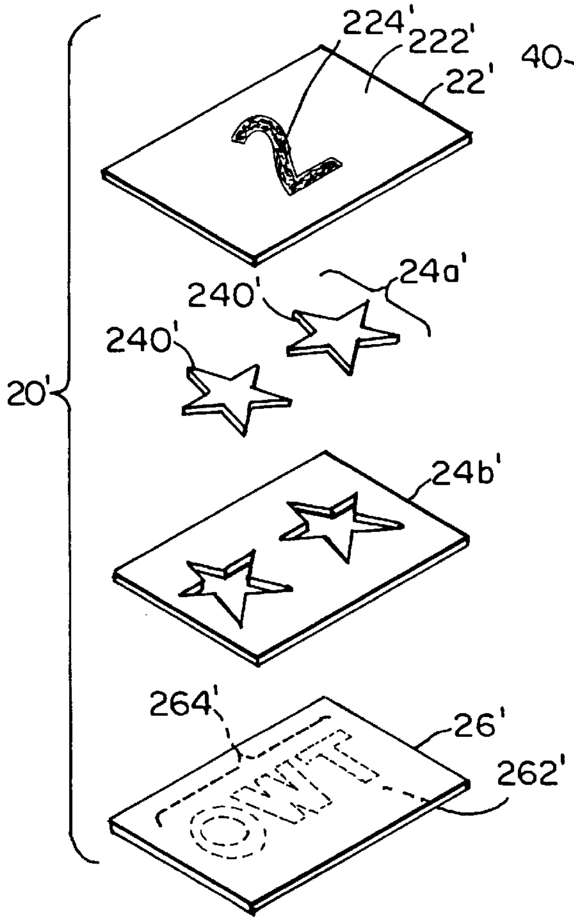
FIG. 6 is an exploded view of a second exemplary embodiment magnetic card.

In FIG. 6, each of a pair of opposing major planar outer sides 222', 262' of a card 201 is opaque and bears non-identical first and second visible images 224' and 264', respectively, of fixed predetermined configuration, for example, the numeral 2 and the word TWO, respectively, which are related in content in that they have the same meaning. The first magnet layer 24*a*' has a fixed physical configuration, for example, two identical objects such as stars 240', which have no preferred, left-right orientation. In this type of configuration, either side 222', 262' of the card 20' can be placed on the magnetic display panel 31 to magnetically generate an image of the silhouette of two stars, which is related in content and meaning to each of the first and second visible images 224' and 264' on either side 222' and 262' of such card 201, namely the numeral and letter images of the number two.

Figure 7:
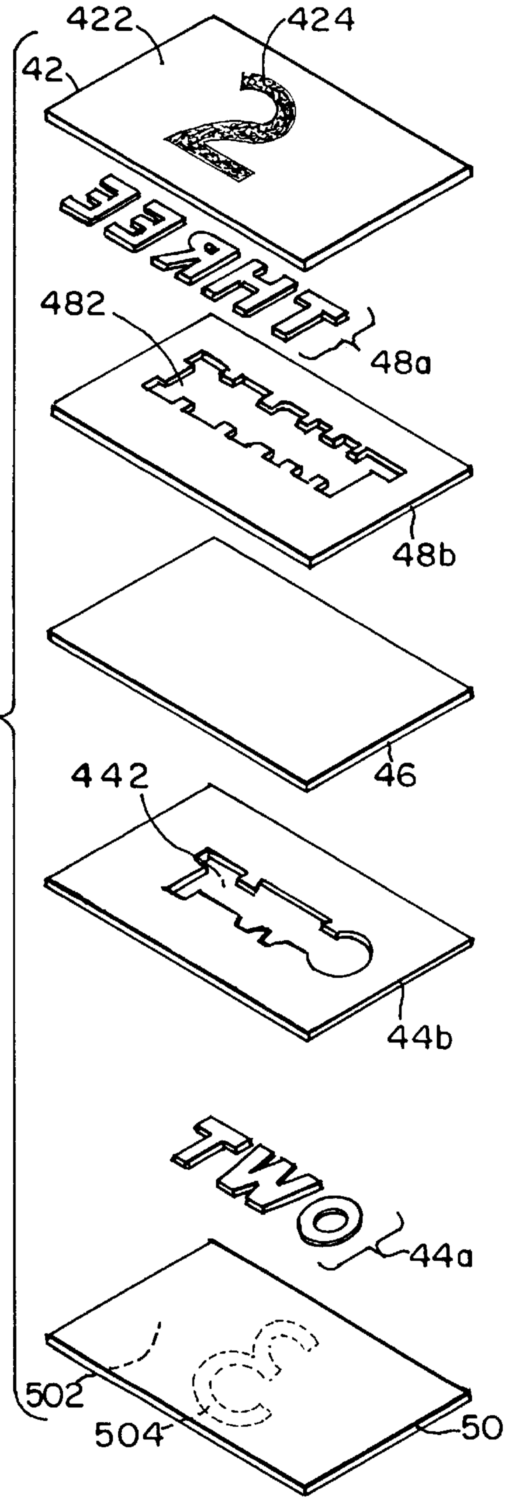
FIG. 7 is an exploded view of a third exemplary embodiment magnetic card.

FIG. 7 is an exploded view of yet another magnetic card embodiment indicated at 40. Like card 20 of FIGS. 1–5 and card 20' of FIG. 6, card 40 preferably comprises a plurality of coadjoining, at least generally parallel, planar layers 42, 48*a*, 48*b*, 46, 44*b*, 44*a* and 50. The thicknesses of the layers are greatly exaggerated for clarity. A pair of the plurality of layers, preferably the pair of opposing outer layers 42 and 50, are opaque. The first outer layer 42 defines a first of a pair of opposing major planar opaque outer sides 422 of the card 40 and bears a first visible image 424 of fixed, predetermined configuration, for example, the numeral 2. The second, remaining, outer layer 50 defines the second, remaining major planar opaque outer side 502 of card 40, and bears a second visible image 504 of fixed, predetermined configuration, for example, the numeral 3, indicated in phantom.

Card 40 further includes a planar, first permanent magnet layer 44*a* formed by three individual planar letters spelling the word TWO and a first frame 44*b* having an internal opening 442, which receives the letters forming the first magnet layer 44*a* such that the magnet layer 44*a* and frame 44*b* are at least generally coplanar. Card 40 further includes a second frame 48*b* and a planar, second permanent magnet layer 48*a* formed by five planar letters spelling the word THREE. The internal opening 442 preferably is adapted by being configured to mate and interferingly engage with portions of the letters constituting magnet layer 44*a* to retain the letters substantially or essentially without movement in a coplanar fashion. The same is true of the internal opening 482 of the second frame 48*b*, which receives and retains the individual letters constituting the second magnet layer 48*a* in an at least coplanar fashion. Finally, card 40 includes a generally planar spacer 46, which is located within the card 40 between the first and second magnet layers 44*a* and 48*a* and between their frames 44*b* and 48*b*, respectively, physically separating the planes of first and second magnet layers 44*a*, 48*a* and of the first and second frames 44*b*, 48*b* from one another. Again, the various layers of card 40 are assembled and held together in a conventional fashion, preferably adhesives (not depicted). When assembled, the opaque outer sides 422, 502 and outer layers 42, 50 cover and hide the magnet layers 44*a* and 48*a* from view.

The first visible image 424 on the first outer side 422 of magnetic card 40 should be related at least in content to the fixed, predetermined physical configuration of the first magnet layer 44*a*. In card 40, the former is equivalent and indeed identical in meaning to the latter. The same is true of the second visual image 504 and the fixed, predetermined physical configuration of the second magnet layer 48*a*. The first and second visual images are different (non-identical) from one another in appearance, content and meaning as are the physical configurations of the first and second magnet layers 44*a* and 48*a*. It will further be appreciated that in this dual use card 40, the second magnet layer 48*a* is located within the card 40 between the first outer side 422 of the pair of outer sides bearing the first visible image 424 and its related, first magnet layer 44*a* while layer 44*a* lies between the second outer side 502 with its second visual image 504 and its related magnet layer 48*a*.

The magnetic field generated by each of the magnet layers 24*a* and 24*a*' in the previous two cards 20, 20' is sufficiently strong to act through the immediately adjoining card layers 22/26 and 22'/26'. However, it is desired in card 40 that only one of the two permanent magnet layers 44*a* and 48*a* act upon the magnetic display device 30 when the card 40 is positioned on the screen 32 of such device. One characteristic of the field of a permanent magnet is that it drops quickly in strength as it extends away from the magnet. Consequently, spacer 46 should be of a thickness sufficient to space either of the two magnet layers 44*a* and 48*a* which happens to be most remote from the screen 32 when the card 40 is placed on the screen 32 sufficiently far from the screen 32 such that its magnetic field is too weak to move the magnetic particles 36 in device 30 to form a magnetically generated image on the screen duplicating the configuration of the remote magnet layer. When the card 40 is applied to the display device 30 with first outer side 422 and its first visible image 424 exposed and its second outer side 502 bearing the numeral 3 down on the screen 32 of the magnetic display device 30, the characters T, W and O constituting the first magnet layer 44*a* are sufficiently close to attract the particles 36 within the device 30 to form a first magnetically generated image 362 shown in FIG. 5, namely the word TWO.

Figure 8:
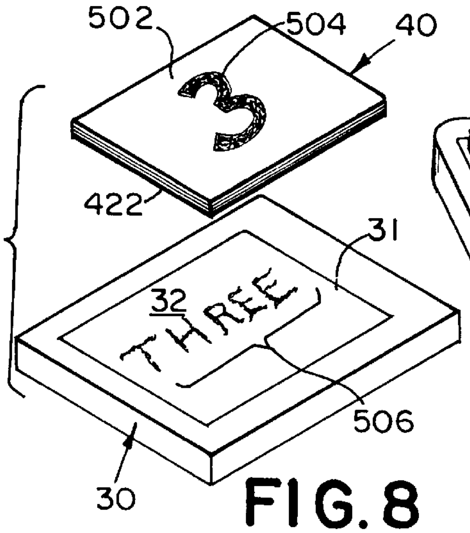
FIG. 8 depicts the altered state of the display device after one side of the card of FIG. 7 has been placed on and removed from the upper surface of the display device.

Referring to FIG. 8, when the first outer side 422 is placed down on the screen 32 of the display device 30 with the second outer side 502 and the second visible image 504, the numeral 3, facing upward, the second permanent magnet layer 48*a* is located closer to the screen 32 than is the first magnet layer 44*a* and is again of sufficient strength to attract the solid particles 36 within the device 30 to the underside of the transparent upper planar sheet 33 to form a different magnetically generated image 506, namely the word THREE, which is non-identical in appearance yet identical in content and meaning to the numeral 3, which is now visible with the card 40 on the device 30.

Figure 9:
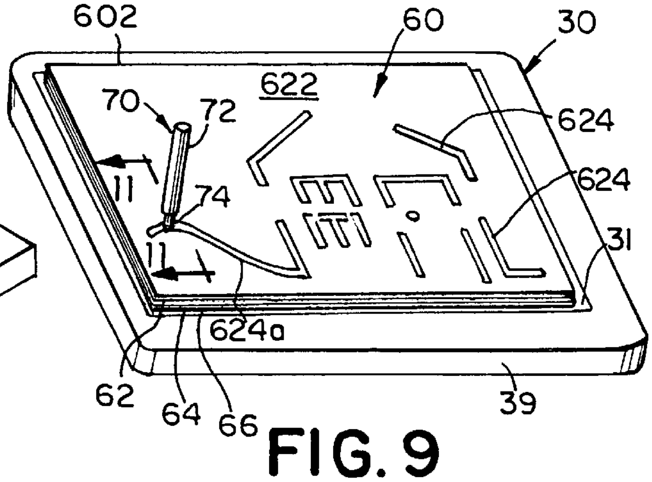
FIG. 9 is a perspective view of a first major planar side of fourth exemplary embodiment magnetic card of the present invention being used on a magnetic display device.
Figure 11:
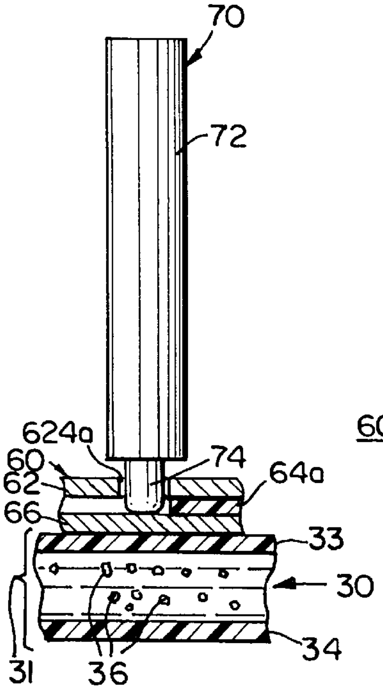
FIG. 11 is a localized cross-sectional view taken along the lines of 11—11 in FIG. 9.
Figure 10:
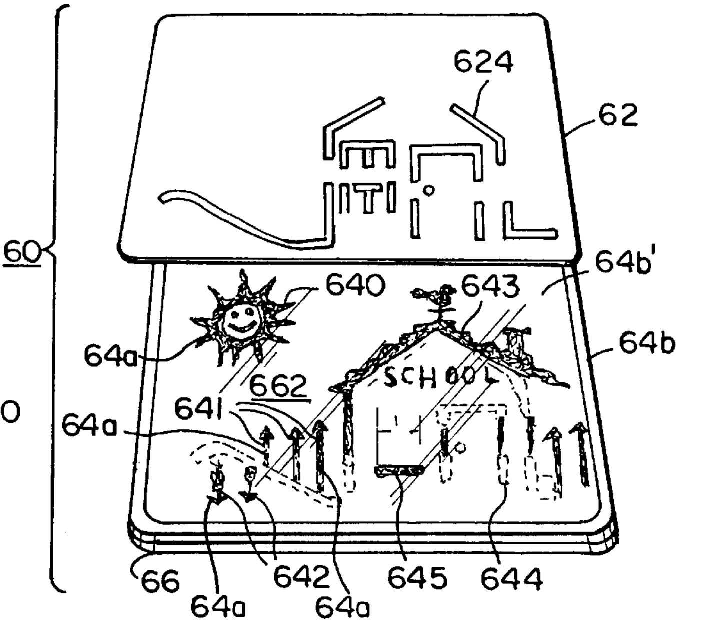
FIG. 10 is an exploded view of the magnetic card of FIG. 9.

FIGS. 9 through 11 depict a fourth exemplary embodiment magnetic card of the present invention indicated generally at 60. The card 60 is again formed from a plurality of coadjoining, generally parallel, planar layers, three layers 62, 64 and 66 being indicated in FIGS. 9 and 10. Again, outer layers 62 and 66 are generally opaque. A first outer side 622 bears a first visual image indicated generally at 624. The visual image 624 is formed by an at least depression within an outer perimeter 602 of the card 60.

FIG. 10 depicts card 60 in an exploded view. The first or upper layer 62 is again shown with a plurality of depressions in the form of slots and holes therethrough, which define the first visual image 624. The slots can be outlined in black or a color contrasting with the remainder of side 622 for greater visibility. Alternatively, the underlying layer(s) of the card 60 can be provided in a contrasting color which can be seen in the bottom of each slot. The opposing outer layer 66 is a solid planar sheet of suitable material. The intermediate layer 64 includes a first permanent magnet layer **64*a* formed collectively in a common plane by a plurality of individual, planar, permanent magnet elements, some of which are identified at 640 through 645 which are again cut or otherwise formed from permanently magnetized polymer sheet in the desired configuration and then glued directly to the inner surface 662 of outer layer 66 in the desired location. The individual coplanar magnetic element 640 et al. are located within a central opening 64*b* of a frame 64*b* with which the outer layers 62 and 66 are secured. It should not be necessary but, if desired, slots and other openings like those forming a first visual image 624 can be provided through the second outer layer 66 of the card 60** as well.

FIG. 9 depicts the card 60 in use with a magnetic display device 30 previously described. Card 60 is placed upon the screen defined by panel 31 and a stylus 70 having a handle 72, which can be gripped like a writing instrument, and a permanent magnet tip 74 is used to complete an image 68 on screen 32. As is seen in FIG. 9, the magnetized tip 74 of the stylus 70 is inserted into slot **624*a* and each other slot and depression forming part of first visible image 624 of the first outer layer 622 to bring the tip 74 sufficiently close to the magnetically attracted particles in the display panel 31 to draw those particles to the inner side of the upper planar sheet of the display device 30. FIG. 11 depicts the stylus 70 positioned in one of the depressions 624*a* forming part of the first visual image 624 of the card 60. As can be seen, the tip 74 of the stylus 70 extends through the plane of the first outer layer 62 and at least into the plane of the first magnet layer 64*a* of the card 60**.

Figure 12:
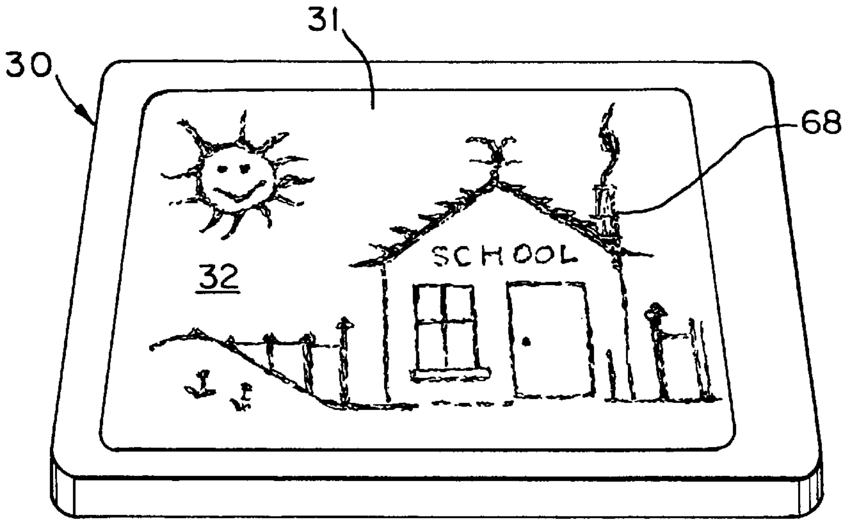
FIG. 12 is a perspective view of the display device of FIGS. 9 after the magnetic card has been removed.

The final image generated by the combined action of the first magnet layer **64*a* and insertion of stylus 70 in the depressions defining first visible image 624 is indicated at 68 on the screen 32 of the device 30 in FIG. 12. It will be appreciated that the physical configuration of the first magnet layer 64*a* and of the first visual image 624 are complementary in appearance in that together the two define a completed visual design which is the image of 68 generated on the screen 32 of panel 31**.

Figure 13:
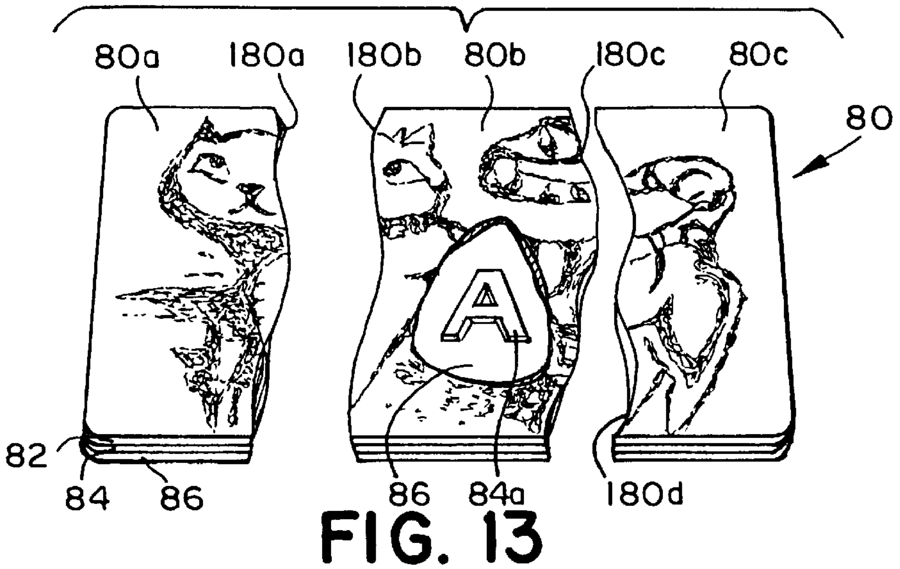
FIG. 13 is a partially broken away perspective view of a first major planar side of a fifth exemplary embodiment magnetic card of the present invention.

FIG. 13 depicts in a perspective, partially broken away view, a fifth exemplary embodiment magnetic card of the present invention, indicated generally at 80 of three layers 82, 84, 86. Card 80 is further in the form of a puzzle defined by a plurality of individual card elements **80*a*, 80*b* and 80*c*. Each of the planar card elements 80*a*, 80*b* and 80*c* has mutually adjoining and, in this embodiment, curvilinear mating edges 180*a* with 180*b* and 180*c* with 180*d*. In this magnetic card embodiment 80, each of the three individual planar card elements 80*a*, 80*b*, 80*c* is also formed by a plurality of coadjoining, generally parallel planar layers and has a pair of opposing major planar opaque outer sides, a first one of which is visible in FIG. 13. The first outer side of card 80 bears a first visible image in a fixed, predetermined configuration of a cat. Sandwiched between the two outer layers 82, 86 is a magnet layer formed by three planar letters, C, A and T. The upper, outer layer 82 of center element 80*b* is partially broken away in FIG. 13 to reveal the card's lower layer 86 and its generally planar, permanent magnet letter A, which is part of the magnet layer 84*a* of card 80. In use, the planar card elements 80*a*, 80*b*, 80*c* are fitted together along their mating edges 180*a* with 180*b* and 180*c* with 180*d*, and positioned on the screen 32 of on a display device 30. The magnet layer 84*a* within the card 80 causes the word CAT to be formed on the panel 31 of the display device 30. Each of the individual planar card elements 80*a*, 80*b*, 80*c* contains no more than a portion of the first visible image of the cat and no more than a portion of the first permanent magnet layer within the card 80, which are related to one another in content (portions of word and image of a cat) but not directly related in meaning. The relation in meaning occurs only when the elements 80*a–c* are properly combined to form the image and word cat. Although the mating edges 180*a*–180*d* of the preferred embodiment card 80 shown in FIG. 13** are curvilinear, it will be appreciated that they could be straight as well.

Figure 14:
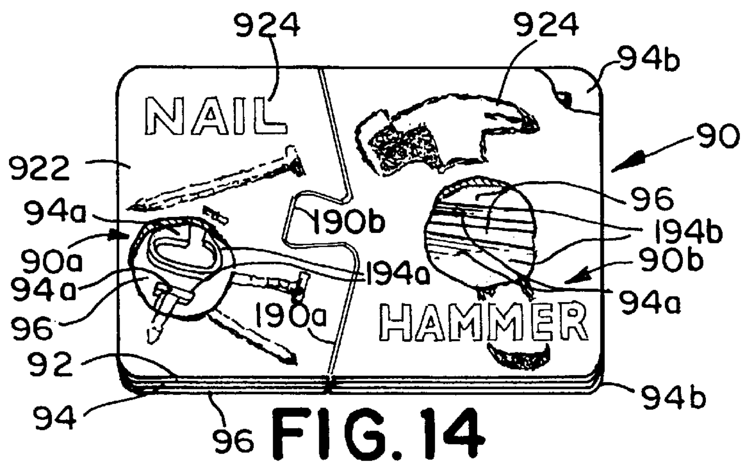
FIG. 14 is a perspective view of a sixth exemplary embodiment magnetic card of the present invention.

FIG. 14 depicts yet a sixth exemplary embodiment magnetic card indicated generally at 90 of three layers 92, 94 and 96 having a different puzzle configuration. The card 90 is defined by two individual planar card elements **90*a*, 90*b* having nonlinear, mutually interlocking mating edges 190*a*, 190*b*. Again, the card 90 is formed by a plurality of coadjoining, parallel, planar layers including a first permanent magnet layer 94*a* located between and covered and hidden by a pair of opaque outer layers 92, 96 on either side of the intermediate layer 94. Layers 92, 96 form the opaque outer sides of the card 90. The intermediate layer 94 further includes a frame 94*b* coplanar with the first magnet layer 94*a* surrounding and receiving the first magnet layer 94*a*. FIG. 14 is partially broken away to show portions 194*a* and 194*b* of the magnet layer hidden within the card 90 between its outer opaque layers 92 and 96 and in each of the card elements 90*a*, 90*b*. The first major planar opaque outer side 922, which is depicted in FIG. 14, bears a first visible image indicated generally at 924, which comprises separate illustrations of a plurality of nails, together with the word NAIL, and a separate illustration of a hammer, together with the word HAMMER. Instead of being printed, the words NAIL and/or HAMMER can be formed by depressions in the uppermost layer 92 of the card 90 extending through the magnet layer 94*a* of the card to permit the card to also be used as a stencil in the manner described with respect to card 60 in FIGS. 9 through 12**.

Figure 15:
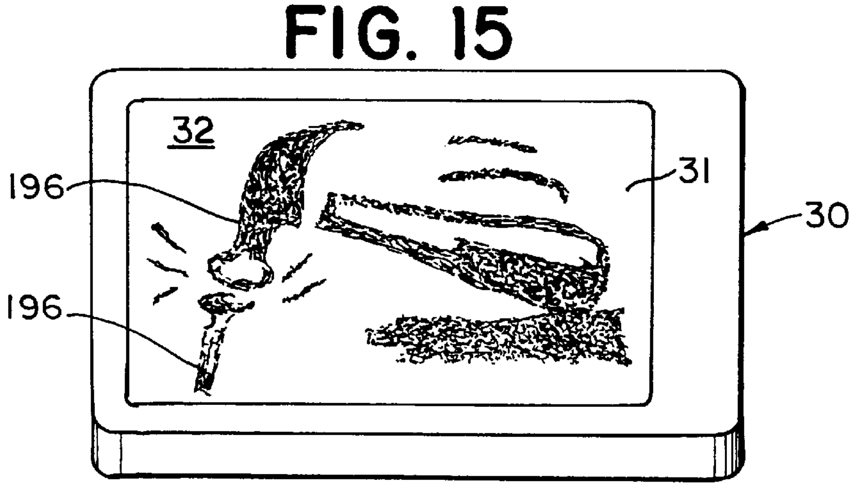
FIG. 15 is a perspective view of a display device with an image generated by the magnet layer of the card of FIG. 14.

FIG. 15 depicts a display device 30 with an image indicated generally at 196 generated on its magnetic panel 31 by the magnet layer **94*a* of the card 90. Image 196 is identical in appearance to the configuration of the magnet layer 94*a* of the card 90. The first visual image 924 and first magnet layer 94*a* of card 90 illustrate an action relationship between the hammer and nails depicted separately in the first visual image 924. The magnetically generated image 196** shows those items in use, and duplicates the configuration, in particular, the silhouette of the magnet layer 94*a* within the card 90.

Figure 16:
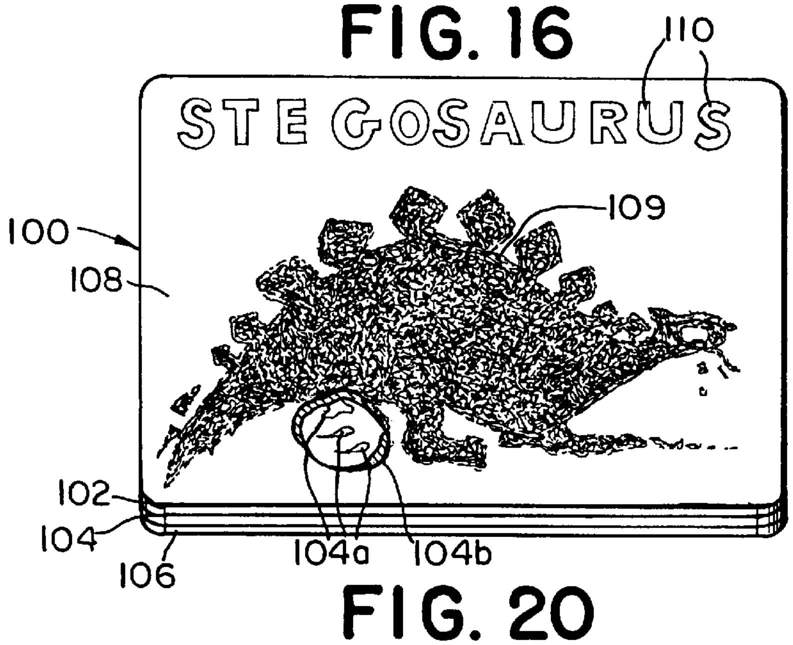
FIG. 16 is a partially broken away perspective view of a seventh exemplary embodiment magnetic card of the present invention.

FIG. 16 depicts yet a seventh exemplary embodiment magnetic card of the present invention indicated generally at 100. Again, the card is preferably formed by three coadjoining, planar, parallel layers 102, 104 and 106. A first major planar side 108 includes a first visible image 109 in the form of an illustration of a dinosaur. If desired, grooves 110 can be provided extending at least through the planes of the first two layers 102 and 104 to permit stenciling of the letters on a magnetic display device with a permanent magnet tipped quill 70 in the manner previously described. Card 100 is partially broken away to reveal a portion of the permanent magnet layer 104*a* formed by three separate permanent magnet pieces and of the frame 104*b* surrounding the magnet layer 104*a* and coplanar with the magnet layer 104*a*. In this case, the magnet layer 104*a* is in the physical configuration of a plurality of individual elements shaped and positioned to represent skeletal remains of the dinosaur depicted in the first visual image 109. When the card 100 is placed upon a conventional magnetic display device 30 and then removed, the magnet layer 104*a*leaves an image of the skeleton of the particular dinosaur depicted in the first visual image 109 as well as any lettering that may have been created by running a magnetic tipped quill like quill 70 of FIG. 9 through the grooves 110 of a magnetic card 100.

In addition to cutting premagnetized flexible sheets, the magnetic layer of the magnetic cards of the present invention can be provided in various other ways. For example, existing flexible, permanently magnetic sheets are made with naturally magnetic particles, which can be aligned by an externally applied magnetic field during manufacture of the sheets so that they remain aligned and produce a coherent magnetic field after fabrication.

Flexible sheets can also be fabricated with ferromagnetic particles which can be permanently magnetized by the application of a strong external magnetic field after the sheets are fabricated. The sheets provided commercially are typically uniformly magnetized across their length and width. However, such sheets with ferromagnetic particles can be selectively magnetized in areas that correspond identically or substantially identically to the silhouette of the visual image desired to be generated on the screen of the magnetic display device with which a card containing the sheet is used. It has been found possible to selectively magnetize such flexible sheet material in various ways, which will be described, to permanently magnetize selected areas of the sheet material to a sufficient degree to generate an image on a magnetic view screen like those previously described.

Figure 17:
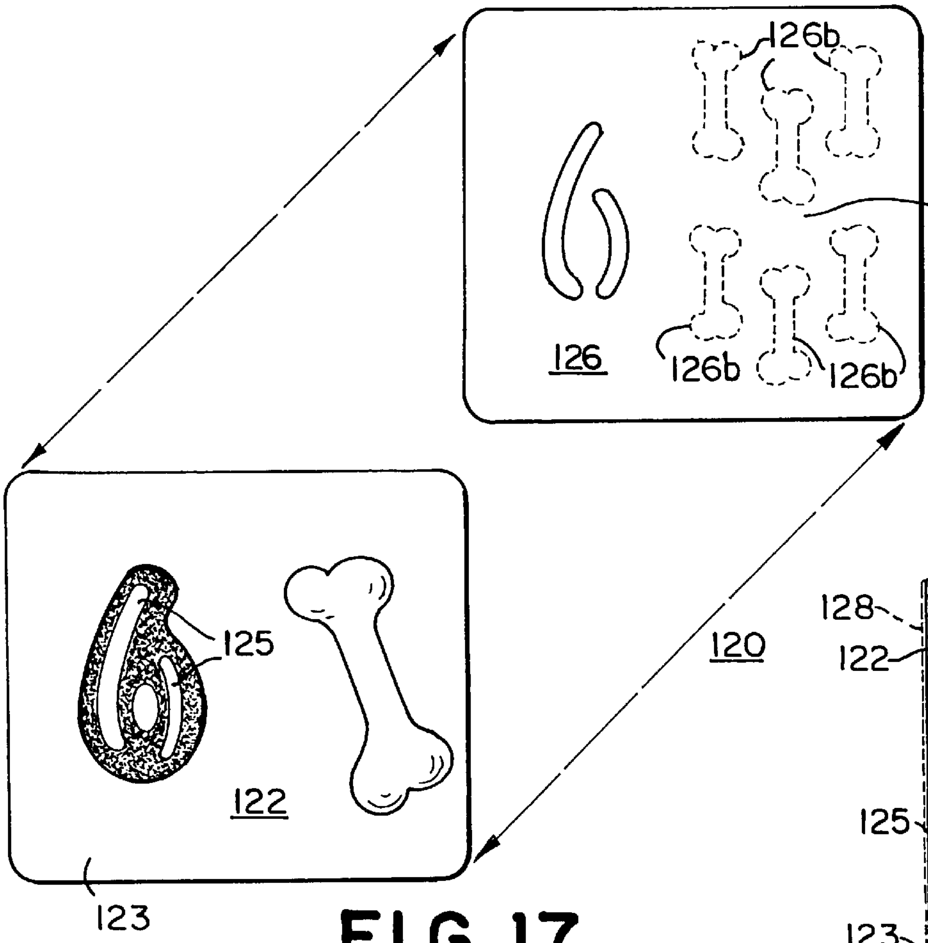
FIG. 17 is an exploded front view of an eighth exemplary embodiment magnetic card of the present invention.
Figure 18:
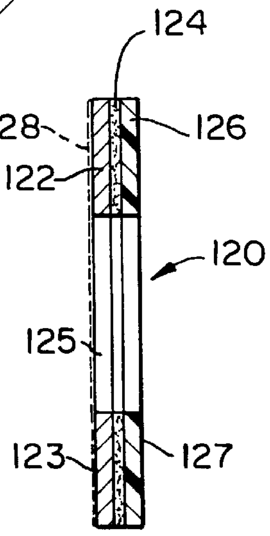
FIG. 18 is a sectional view taken along the lines 18—18 in FIG. 17.

FIGS. 17 and 18 are front and cross-sectional views of an eighth exemplary embodiment magnetic card of the present invention indicated generally at 120. Card 120 is preferably formed by only two coadjoining, planar, parallel layers 122 and 126 which preferably are fixedly secured together by an intermediate adhesive layer 124 as is best seen in FIG. 18 but which could be joined by other means. Layers 122 and 126 define a pair of opposing major planar opaque outer sides 123 and 127, respectively, of the card 120. If desired, a protective coating 128 (in phantom) may be applied to the outer side 123 formed by the exposed major planar surface of layer 122.

Referring back to FIG. 17, the first major side 123 of the card 120 bears a first visible image in the form of a cut-out 125 in the shape of the numeral "6", which preferably extends completely through the thickness of card 120. Layer 126 is a flexible layer of magnetic material that has been permanently magnetized over at least part of its area. Layer 122 is preferably a cellulose based layer such as a sheet of printable paper/card stock, and is provided to add greater stiffness to the card, to accept printing and to space the magnetic layer 126 from the first outer side 123 of the card. The layer 126, which is the first layer of magnetic material of the card 120, has major planar sides which are co-extensive in both area and shape with the major planar outer sides of printable layer 122 and the card 120 itself.

Unlike the previous embodiments of the present invention, the first layer 126 of magnetic material is permanently magnetized in a predetermined configuration in only a portion of its overall area. The permanently magnetized area of predetermined configuration is indicated generally at 126*a* in FIG. 17 and consists of six, separate, individual bone-shaped segments 126*b*. The remainder of the first layer 126 is left unmagnetized. When the lower outer surface 127 of the card 120 is applied to the screen 32 of device 30 (see FIG. 3), the permanently magnetized area 126*a* attracts particles 36 so that they form an image which is a silhouette of the permanently magnetized area 126*a*, namely silhouettes of the six clustered, individual, bone-shaped segments. The cut-out 125 is sufficiently wide to permit the previously described stylus 70 or a comparable instrument to be extended through the card 120 into proximity with the screen 32 of a device 30 receiving the card 120 and to be moved along the cut-out 125 to reproduce a visible image of the numeral "6" on the screen with the visible image of six bone-shaped silhouettes produced by the permanently magnetized area 126*a* of the card 120.

Figure 19:
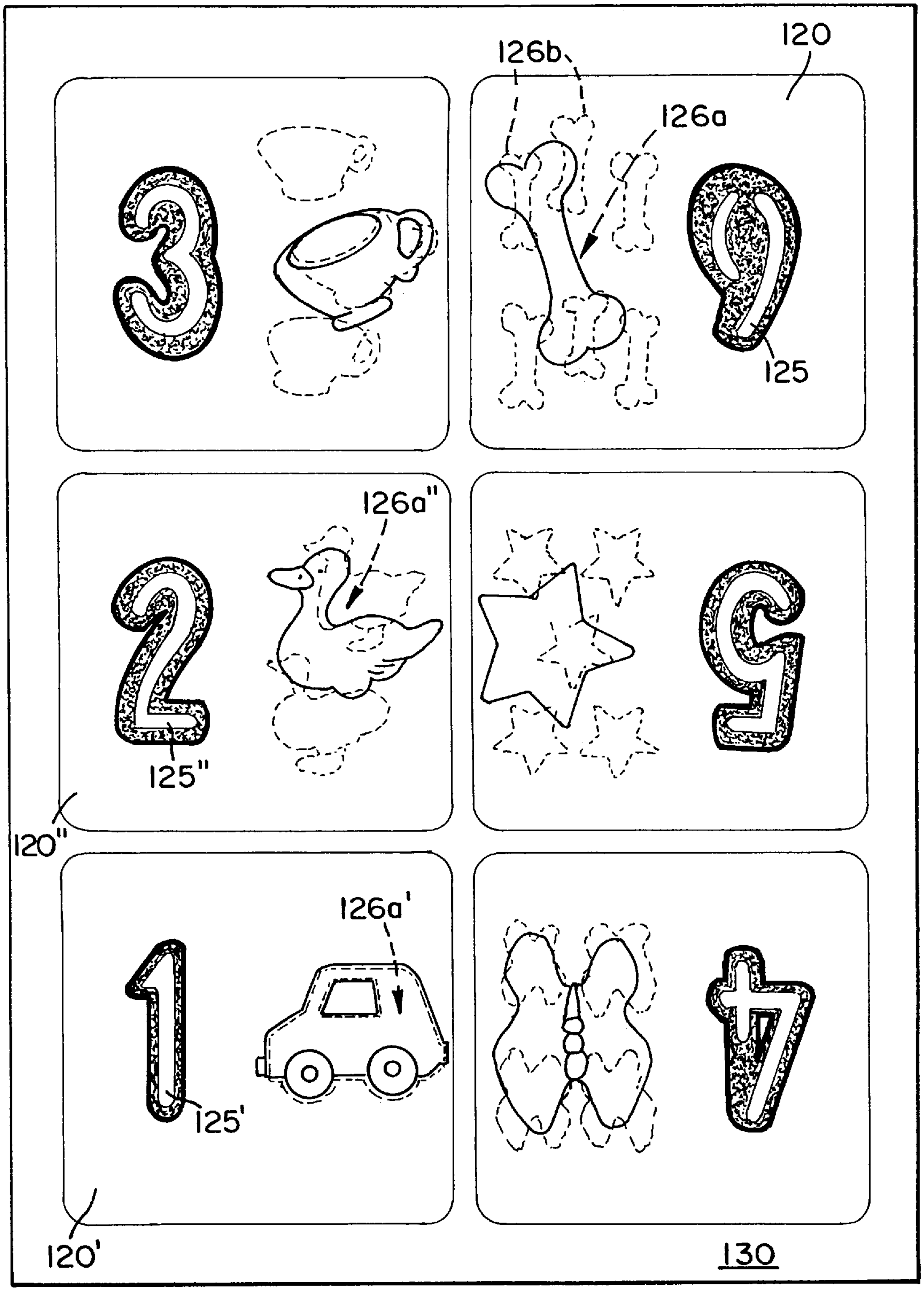
FIG. 19 is a front view of a ninth embodiment magnetic card of the present invention incorporating the magnetic card of FIGS. 17 and 18 with other magnetic cards as part of a set in a larger card.

FIG. 19 shows the card 120 being formed simultaneously with like cards 120', 120", etc. in a single sheet 130. Sheet 130 is itself a magnetic card of the present invention having all of the attributes of the individual cards 120, 120', etc. Each of the cards 120', 120" includes a first visible image 125', 125", etc. and as all other cards of the invention, permanently magnetized areas 126*a'*, 126*a"*, etc. indicated generally in each card 120', 120", etc. Areas 126*a'*, 126*a"*, etc.extend over only a portion of the overall card 120', 120", etc. and its magnetic material layer. The individual, permanently magnetized portions of the magnetic layer, which collectively constitute the permanently magnetized areas 126*a"*, etc. in all but card 120' are indicated in phantom. Only in card 120' is there a single, permanently magnetized segment and it is identical in silhouette to the auto portion of the first visible image 125' of that card.

Sheet 130 is made using a single continuous sheet of the flexible, permanently magnetizable material and an adhered sheet of the cellulose based paper/card stock. In each card 120, 120', 120", etc., the first visible image is related to the magnetically reproducible silhouette of each permanently magnetized area 126*a*, 126*a"*, 126*a"*, etc. by being equivalent in meaning.

Figure 20:
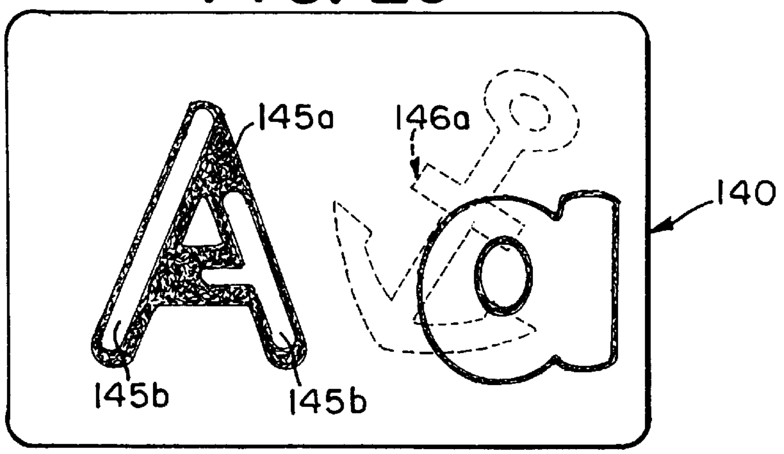
FIG. 20 is a front view of a tenth exemplary embodiment magnetic card of the present invention.
Figure 21:
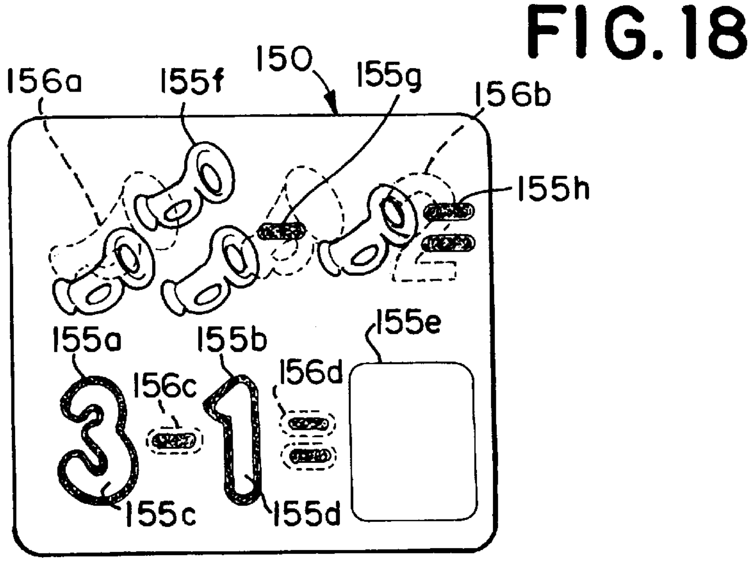
FIG. 21 is a front view of an eleventh exemplary embodiment magnetic card of the present invention.

FIGS. 20 and 21 illustrate tenth and eleventh card embodiments 140 and 150, which are letter learning and simple arithmetic learning cards, respectively. The first visible image 145 of card 140 is a printed capital letter "A" indicated at 145*a*, with a visible stencil cut-out of the capital letter A, indicated at 145*b* and preferably extending entirely through the card. A permanently magnetized area 146*a* of the card 140 has the configuration of an anchor, the silhouette of which is indicated in phantom in the figure and is magnetically reproducible on device 30 of FIG. 3.

Arithmetic learning card 150 includes a first visible image formed collectively by individual elements 155*a*, 155*b* in the form printed numbers “3” and “1” containing stencil cut-outs 155c, 155d of the same numbers as well as a cut out area 155e where an answer can be recorded. It further bears a printed image that includes four horns 155f, two subtraction signs 155g and two equal signs 155h, The first layer is selectively magnetized in areas 156a, 156b, 156c and 156d, which have configurations of two horns, numeral “2”, a minus sign and an equal sign, respectively. The silhouettes of these areas can be magnetically reproduced by the display device 30 (FIG. 3).

Figure 22:
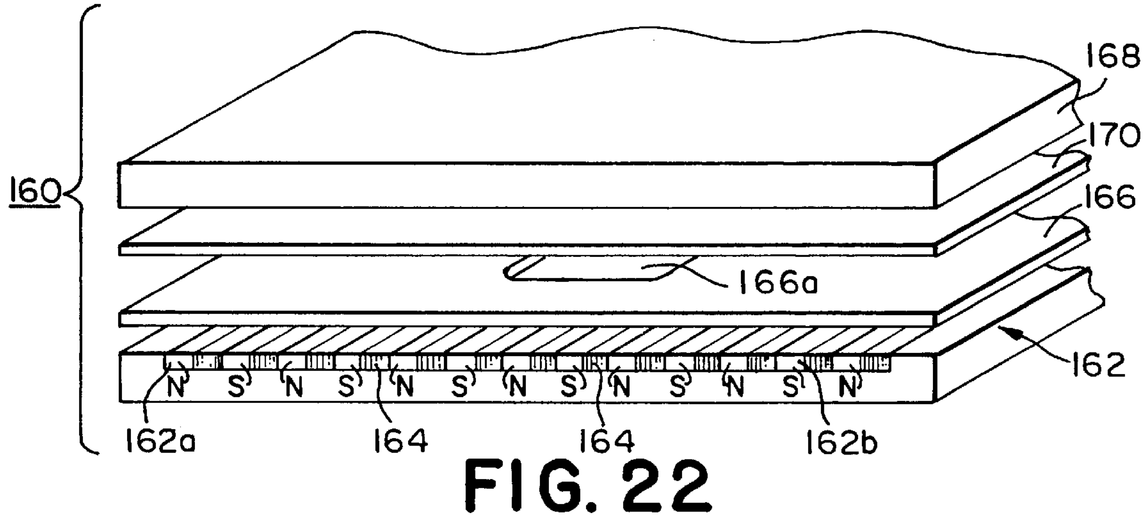
FIG. 22 is a diagrammatic perspective exploded view of a permanent magnet with template used to selectively permanently magnetize one or more areas of a magnetizable flexible sheet material.

Any of the cards 120, 130, 140 and 150 and any other cards similarly having selectively permanently magnetized areas can be fabricated in a variety of ways. FIG. 22 illustrates an apparatus 160, which uses a first proven method of selective magnetization. A multi-pole permanent magnet 162 in plate form is provided with bar-type magnets 162a, 162b, which are laid down in parallel, uniformly spaced rows and are separated by parallel, uniformly sized and spaced steel ribs 164. The magnets 162a, 162b are laid down with their pole ends (N/S) alternated so that a plurality of poles per inch is provided over the surface of the plate 160. Optimal pole spacing is believed to be about ten to twelve poles per inch but as few as four and more than twelve might also be used with varying results.

Positioned over the permanent magnet plate 162 is an essentially non-magnetically permeable template 166, which is made of a suitable material, such as stainless steel, and which is die-cut or otherwise cut to provide an opening 166a with the silhouette of the desired magnetic image in the negative. Template 166 is positioned between the permanent magnet plate 162 and a sheet of the flexible, permanently magnetizable material 170. It is important that the template 166 be as thin as possible yet still thick enough to block the penetration of the magnetic field. Typically a thickness of between 0.015 and 0.025 in. is satisfactory for a permanent magnet having a field strength of at least 5,000 and suggestedly at least 6,000 gauss. The flexible, permanently magnetizable sheet 170 is positioned between the template 166 and a backing plate 168 of steel such as a 1018 cold rolled steel or other material of high magnetic permeability, which presses the sheet 170 through opening 166a into contact with the permanent magnet plate 162. The sheet 170 is kept in contact with the plate 162 until permanently magnetized to the desired strength.

This method is somewhat limited in the amount of detail which can be provided due to the fact that the flexible, magnetizable sheet material 170 must come into contact with the permanent magnets 162a, 162b of plate 162 in order to be magnetized. With the template 166 positioned between the permanent magnet plate 162 and the sheet 170, the spacing and sizing of the cut-out 166a must be sufficiently great to allow flexible sheet 170 to be physically pressed through the template and into direct, physical contact with the magnets 162a, 162b on the surface of magnetic plate 162.

Figure 23:
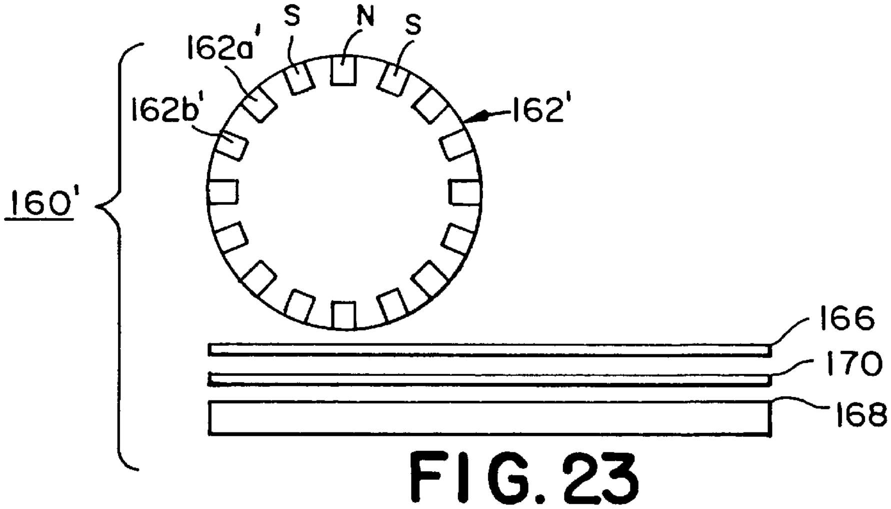
FIG. 23 depicts an alternate form of the apparatus of FIG. 22 having a permanent magnet roller.

While a flat, multi-pole, permanent magnet plate 162 is shown, the multi-pole permanent magnet may be provided in modified apparatus 160' as a roller 162' as shown in FIG. 23 and rolled over a template 166 separating the permanent magnet roller 162' from the flexible, permanently magnetizable material 170 and the steel backing plate 168.

Figure 26:
FIG. 26 is a diagrammatic side elevation showing the fixture of FIG. 24 in use.

FIG. 24 illustrates another proven alternative method for selectively permanently magnetizing flexible, magnetizable sheet material. An electromagnetic fixture 180 can be constructed having a raised face 182 with a physical configuration and silhouette, which is the negative of the physical configuration and silhouette of the permanently magnetized area desired to be produced in the flexible magnetizable sheet 170. A single wire 184 is laid down back and forth across the face in parallel grooves provided in the surface of the fixture face 182 (FIG. 25). The flexible magnetizable sheet 170 is brought into contact with the surface of the face 182. Sheet 170 is again backed by a highly magnetically permeable backing plate 168, again preferably a sheet of 1018 cold rolled steel (FIG. 26). Success has been had using copper wire with polyester insulation approximately 0.035 in. thick run back and forth through slots cut in the face 182 which are parallel and 0.050 in. deep by 0.040 in. wide with 0.040 in. spacing between adjoining slots. The face 182 suggestedly is raised above the surrounding portion of the fixture at least one-quarter inch. The ends of the wire 184 are then connected across a capacitive discharge magnetizer 186, which generates sufficient current to create a sufficiently strong magnetic field around the wire as the current flows through the wire to permanently magnetize the ferromagnetic particles in the magnetizable sheet 170. Acceptable results have been achieved with capacitive discharge magnetizers using settings as little as 400 microfarads with 800 volts to as much as 4200 microfarads with 500 volts. Instead of a plate type electromagnetic fixture, a roller shaped electromagnetic fixture (not depicted) might be used.

FIG. 27 depicts an apparatus indicated generally at 190 for selectively magnetizing permanently magnetizable sheets which combines aspects of the apparatus shown in FIG. 22 and FIGS. 24–26. Apparatus 190 includes a plate 192 mounting a permanent magnet fixture 194. As in FIG. 22, a sheet of the flexible, permanently magnetizable material 170 is positioned facing the fixture 194. A template 196 is positioned between the magnetizable material 170 and the fixture 194. Finally, a backing plate 198 is provided on a side of sheet 170 opposite the fixture 194 and template 196. The template is preferably of stainless steel or other essentially non-magnetic material. The backing plate 198 is preferably a cold roll steel or other ferro-magnetic material having a high magnetic permeability and attraction and is provided to draw the magnetic field through the sheet material 170 from the fixture 194. Template 196 has a central opening 196a shaped substantially identically to the outline of the permanent magnet fixture 194 so that the fixture 194 is capable of passing through the template 196 and into direct contact with the facing surface of the sheet material 170. Template 196 further serves as a clamp and stripper, holding down the sheet material 170 as the permanent magnet fixture 194 approaches and passes through the opening 196 and removing the sheet 170 from the face of fixture 194 as the plate 192 with fixture 194 is backed away from the template 196 and sheet 170. For the permanent magnet field strengths desired to permanently magnetize the sheet material 170, a magnetic attractive force of several hundred pounds can be created between a letter size sheet of flexible material 170 and a comparably sized, permanent magnet fixture.

Referring to FIG. 27A, the fixture 194 is provided by alternating individual bar magnets 194a, 194b with magnetically permeable preferably iron or steel separators 194c. As with the plate 160 in FIG. 22, the poles of the bar magnets 194a, 194b are alternated N,S along the fixture 194. Suggestedly, ten poles per inch are provided with the width of each magnet 194a, 194b and each ferrous spacer 194c being equal and about 0.005 inches.

The apparatus 190 is believed to be more full-proof than is the apparatus 180 in FIG. 26 but the permanent magnet fixture 194 is more expensive to fabricate than is the electromagnetic fixture 180 and apparatus 190 further requires template 196, which is preferably stainless steel. The apparatus 190 is believed to be superior to apparatus 160 and 160' in FIGS. 22 and 23 because it does not require physical distortion of the flexible magnetic sheet material 170, which cause a shadow or cameo effect using the apparatus of FIGS. 22 or 23. It also permits bonding of the flexible sheet material 170 to a pre-printed sheet or piece of card stock 199, indicated in phantom in FIG. 27. The permanently magnetized flexible sheet material 170 becomes the "core" of the resulting two layer card(s) and remains the core or at least part of the core if more layers are added in the manner of the previously described card embodiments. The permanently magnetized sheet 170 with bonded, preprinted card stock need only be cut (for example, as shown in FIG. 19) to complete manufacture of a plurality individual magnetic cards from a single sheet. The magnetic field of material 170 is strongest on the side of the material contacted by the permanent magnet fixture 194.

Cards 120, 130, 140 and 150 consist essentially of an upper cellulose base layer of paper or card stock fixedly secured, preferably adhered to a flexible layer of magnetizable material of preferably uniform material composition. The preferred material is a rubberized sheet having embedded ferromagnetic particles. The magnetic sheet is suggestedly more than 0.010 inches thick, desirably more than 0.015 inches thick and preferably 0.020 or more inches thick. The thickness of the cellulose based layer depends upon the ultimate desired rigidity of the card and the amount of spacing desired to be provided between the magnetic material layer in the upper face of the card which is formed by the exposed outer surface of the cellulose based layer. Suggestedly the cellulose based layer is more than 0.015, desirably at least 0.020 preferably at least 0.024 inches thick. The magnetizable material should have the following magnetic properties: residual inductance 1650 of G; coercive force of 1350 Oe; instrinsic coercive force of 2375 Oe; and maximum energy product (B×H max×10) of 0.065 G Oe. Preferably, the magnetizable layer is permanently magnetized sufficiently to provide a magnetic flux density of at least 200 gauss at the surface of the layer which forms the lower surface of each of the cards 120, 130, 140 and 150. Accordingly, the magnetic flux density of each card on its upper side provided by the exposed outer surface of the cellulose based layer is less than 200 gauss, suggestedly less than 150 gauss and preferably less than 100 gauss. The physical configuration of the cut magnetic layers and of the selectively magnetized areas of the full magnetizable sheets of silhouettes and any of a variety of shapes including letters, numbers, symbols, characters including punctuation marks, physical objects and combinations thereof.

Yet another way of constructing magnetic cards is to utilize a premagnetized or magnetizable, adhesively backed, flexible metal foil rather than a polymer sheet. Such foils also can be cut to the shape of a desired image to be magnetically generated and adhered to one side of a supporting substrate such as a piece of cardboard. The foil can be permanently magnetized by exposure to a sufficiently strong magnetic field. The foil can be covered on both sides by substrates in the manner of the cards previously described in FIGS. 1 and 2 or adhered to one side of one substrate and covered as described in FIG. 7 with an adhered sheet of paper, cloth or even a layer of paint to fully or at least partially hide the foil. Foils could be mounted on both sides of a sufficiently thick substrate to provide separate magnet layers.

Each of the cards 120, 130, 140 is preferably greater in size than a conventional credit cards, which are of a uniform 2⅛ by 3⅜ in. size and thus less than 8 sq. in. in area. The magnetized or magnetizable material layer of each card embodiment described above is also more than two sq. in. and thus greater than the area of a standard magnetic strip applied to credit cards, which is typically ½ in. by 3⅜ inches or less than two square inches in area. In all of the embodiments of the card invention described thus far, the perimeter of the permanently magnetizable material within each card has encompassed a significant portion of the surface area of each card, typically at least one-third or more of the area of the card.

It will be appreciated from these several foregoing examples that the magnetic cards of the present invention can be characterized in various ways: puzzle cards, interactive drawing cards, educational cards, etc. It will be appreciated that the cards can be adapted to a wide variety of educational processes, including spelling, math, vocabulary, word association and other specialized forms. In addition they can be used to illustrate internal construction as if by hidden image/x-ray or the like or metamorphosis, growth or aging. The magnetic cards of the present invention can be used in essentially all instances where so-called flash cards have been used in the past.

It will be appreciated from the various embodiments described that rigidity of the magnetic cards can be increased by using: (1) one or more stronger, solid, middle or intermediate layer or layers with thin, flexible outermost layers or (2) one or a pair of more rigid outermost layers around a frame and permanent magnet layer having large gaps therebetween which provide little strength and rigidity themselves.

It will further be appreciated that magnetic cards could be made with two apparent layers by hollowing out one or both of the outer layers on its (their) inner side sufficiently to receive a permanent magnet layer.

It will further be appreciated that although fairly rigid planar cards are preferred, cards need not be entirely flat on both sides. For example, cards could be made using a single substantially flat and rigid bottom layer to which is directly affixed by adhesive one or more components constituting a permanent magnet layer and the two then covered by a thin flexible sheet material such as paper, cloth, etc. This construction could be exactly reversed with the exposed outer side of the most substantial planar sheet, providing the rigidity to the card, bearing the first and only visual image on the card. The then very thin sheet covering the permanent magnet layer would be placed down on a magnetically actuated display panel with the internal permanent magnet layer pressed directly against the panel, separated only by the thinness of the covering on that side of the card.

Although substantially rigid cards are preferred, it will be appreciated that magnetic cards of the present invention need not be rigid. Cards could be made using a pair of outer layers of very flexible material such as plastic, film or paper sheet or even fabric, which sandwich a flexible permanent magnet layer therebetween. The magnet layer or the individual elements collectively constituting such a layer can be adhered in position between the outer sheets which may themselves be adhered or otherwise laminated together.

It will be appreciated that by thinning or relieving the surface of the permanent magnet layer at spots, the strength of the magnetic field generated by any magnet layer can be varied to give some indication of shading as well as shape on the screen 32 of a device 30 or other, like display panel 31.

The layer(s) of permanently magnetizable material of a the magnetic cards of the present invention can have an other than a solid rectangular configuration as it is such an other than solid rectangular configuration which, at least in part, distinguishes some of the magnetic cards of the present invention from credit or transaction or security cards and the like bearing a rectangular magnetic information strip. It is the physical configuration, in particular, the silhouette of the permanently magnetized portion of the magnet layer, which carries the information or the bulk of the information which is embodied in the permanent magnet layer(s) of the magnetic cards of the present invention and which is desired to be conveyed to the user.

What is important is that the configuration of the permanently magnetized portion of each magnet layer(s) is related at least in content with the visual image(s) provided on the outer side(s) of the magnetic cards of the present invention. That relation may be an equivalence of meaning, as with the numeral 2 and the word TWO in the embodiments of FIGS. 1–5 and 7 or the numeral 2 and the two stars of FIG. 6. Such an identity would be used in a mathematical flash card type configurations of the magnet card where the magnet layer would have a configuration of the numeral which is an answer to an equation printed on the card. The relationship may also be definitional as with the visual image of an object like the cat on the card 80 of FIG. 13 and the magnet layer spelling out the word CAT. Examples of the various relationships which might exist and be represented by magnetic cards of the present invention are innumerable. However, the relationship between at least one image visible on the exterior of the card and the configuration or silhouette of a the permanently magnetized portion of the magnet layer on or within the card characterizes cards of the present invention.

Yet another way of constructing magnetic cards is to utilize a premagnetized or magnetizable, adhesively backed, flexible metal foil rather than a polymer sheet. Such foils also can be cut to the shape of a desired image to be magnetically generated and adhered to one side of a supporting substrate such as a piece of cardboard. The foil can be permanently magnetized by exposure to a sufficiently strong magnetic field. The foil can be covered on both sides by substrates in the manner of the cards previously described in FIGS. 1 and 2 or adhered to one side of one substrate and covered as described in FIG. 7 with an adhered sheet of paper, cloth or even a layer of paint to fully or at least partially hide the foil. Foils could be mounted on both sides of a sufficiently thick substrate.

Yet another method of providing a magnetic layer of magnetic cards of the present invention is to utilize a magnetic or magnetizable ink, which can be applied by suitable means such as silk screening, stenciling or printing to one or both sides of a supporting substrate. Preferably the printed image could be covered to hide its presence and to permit use of a reversed image should the meaning of the configuration or silhouette of the printed magnetic layer depend upon its left to right orientation. However, where the physical configuration or silhouette of the magnetic layer does not have such a preferred left to right orientation for meaning, the ink layer could be printed as an external visible image on one side of the card. Indeed, any of the previously described magnetic layers could be exposed to view on one side of a magnetic card of the present invention, if desired.

Presently preferred inks contain naturally magnetic particles of strontium ferrite. Various particle sizes, preferably sizes averaging between about 1 and about 5 microns can be used. The smaller particle sizes can be applied with silk screens. The larger particle sizes can be applied with a stencil. The particles should be provided in a density to generate at least 4, suggestedly at least 8 and more preferably 12 or 16 poles per inch in the magnetic layer. The particles are magnetically aligned by the application of an external magnetic field, suggestedly of at least about 500 gauss, while the ink is wet and the particles are mobile.

The magnetic layer(s) of the magnetic cards of the present invention should create magnetic field strengths of at least about 100 gauss at the surface(s) of the card to be applied to the magnetic display device. Increasingly sharper and darker images are created by greater magnetic field strengths. It is presently believed to be commercially desirable for the magnetic layer(s) of such cards to produce a magnetic field strength of at least 200 gauss or more at the surface of a magnetic card for use of such cards with the previously described, existing magnetic display devices.

Figure 28:
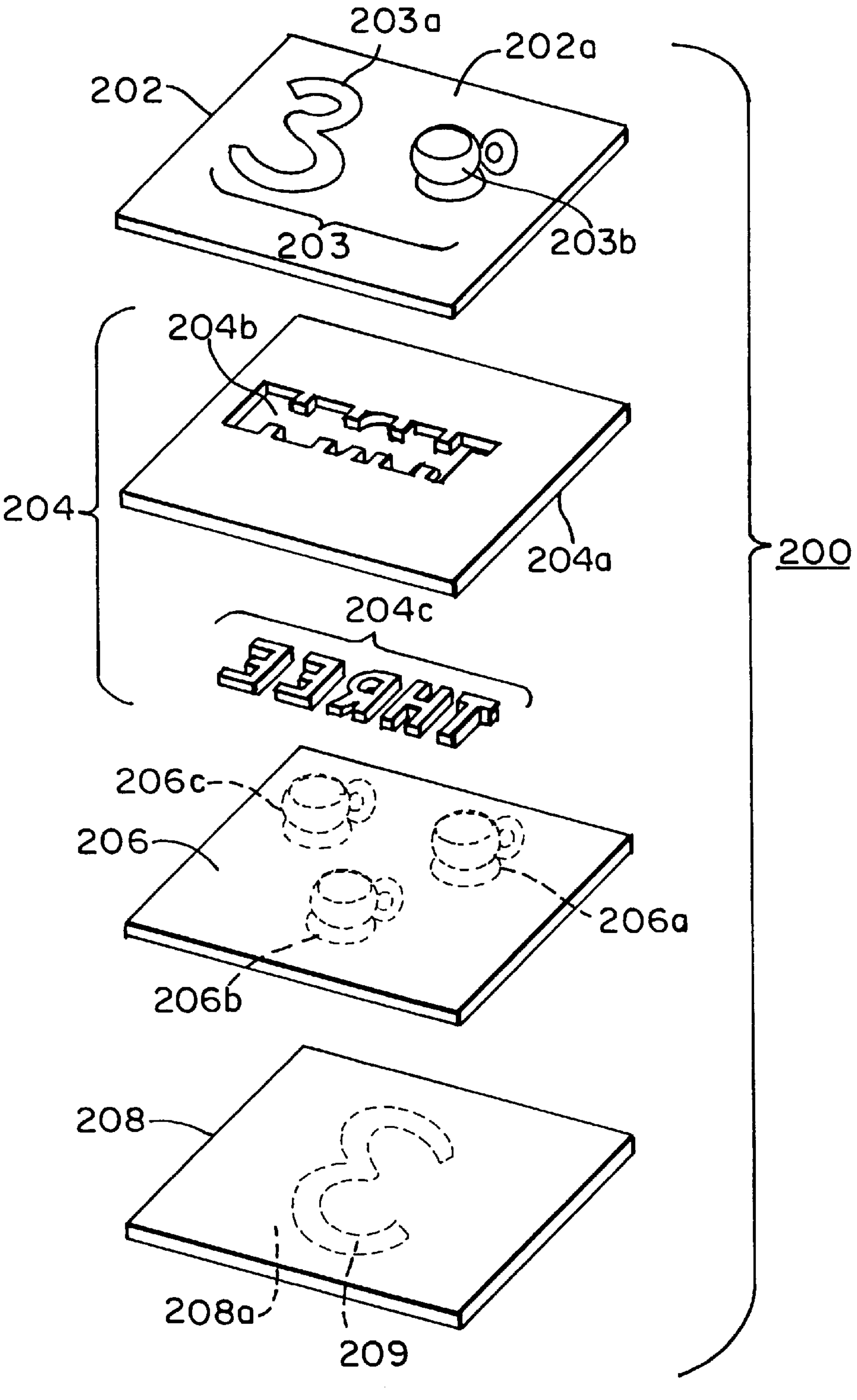
FIG. 28 is an exploded perspective view of a twelfth exemplary embodiment magnetic card of the present invention.

FIG. 28 depicts an exploded view of a twelfth and final exemplary embodiment magnetic card of the present invention which is indicated generally at 200. Card 200 combines aspects of the cards of FIGS. 1–16, which employ as its magnetic layer, pieces of permanently magnetized sheets cut to the desired configuration and profile of the magnetic image to be created, and the cards of FIGS. 17–21, which use selectively magnetized rectangular, solid, one-piece sheets. Magnetic card 200 in FIG. 28 is formed by a plurality of coadjoining and preferably generally planar and parallel layers 202, 204, 206 and 208, respectively. The outer two layers 202 and 208 preferably define the pair of opposing major planar opaque outer sides 202*a* and 208*a*, respectively, of the card 200. First side 202*a* is visible in the figure and bears a first visible image indicated generally at 203. In this case, the first visible image 203 has two components, a numeral 3 indicated at 203*a* and the figure of a teacup indicated at 203*b*. The exposed outer side 208*a* of the second, opposing outer layer 208 bears a second visible image 209, for example, the numeral 3 indicated in phantom.

Layer 206 constitutes a first permanent magnet layer of the card 200 and is provided by a single, one-piece sheet of the flexible, selectively permanently magnetized material, which has been selectively magnetized in three areas 206*a*, 206*b* and 206*c*, each in the configuration and profile of a teacup like to teacup 203*b* in the first visible image 203. Layer 204 of card 200 constitutes the second permanent magnet layer and has two components which together define one permanent magnet layer of the card 200. Layer 204 is formed by a frame 204*a* having a central cutout 204*b* which receives a plurality of permanent magnet letters 204*c* spelling the word THREE cut from permanently magnetized flexible sheet material. While both visible images 203 and 209 are directly related in meaning to the configurations of the permanently magnetized portions or areas of the layers 204 and 206 (all depict some representation of THREE), the second magnetic layer 204 and the second visible image 209 could be related to one another and different in all respects from the first visible image 203 and configuration of the permanently magnetized areas or portions of the first magnetic layer 206. Layer 208 could be a very thin printable plastic film adhered to the flexible magnetizable sheet layer 206.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An integral magnetic imaging card comprising:

a pair of opposing major outer sides;

a first visible image fixed on a first of the pair of opposing major outer sides; and a core underlying at least the first major side, the core including at least a first magnet layer of magnetic material, the first magnet layer having a pair of opposing major sides, and being permanently magnetized in a first fixed predetermined configuration having a magnetically reproducible, other than rectangular first silhouette related at least in informational content to the configuration of the first visible image.

2. The magnetic card according to claim 1 wherein the first magnet layer is also generally coextensive in shape and area with the shape and area of the pair of opposing major outer sides of the card.

3. The card of claim 2 consisting essentially of the first magnet layer and a cover layer secured to one of the opposing major sides of the first magnet layer, the cover layer bearing the first visible image.

4. The magnetic card according to claim 1 wherein the pair of opposing major outer sides are opaque and wherein the first magnet layer is hidden within the card by being covered by the pair of opaque outer sides.

5. The magnetic card of claim 4 wherein the magnetic material of the first magnet layer has a fixed, other than solid rectangular physical shape different in appearance from the first visible image.

6. The magnetic card according to claim 1 wherein a second visible image is fixed on a second of the pair of outer sides.

7. The magnetic card according to claim 6, further comprising a second magnet layer of magnetic material located within the cards covered by the pair of opaque outer sides and within a plane parallel to and separate from a plane containing the first magnet layer, the second magnet layer being permanently magnetized in a second fixed predetermined configuration having a magnetically reproducible second silhouette different in shape from the magnetically reproducible first silhouette of the first magnet layer yet at least related in meaning to the second visible image.

8. The magnetic card according to claim 7 wherein the second magnet layer is located within the card between the first one of the pair of outer sides bearing the first visible image and the first magnet layer.

9. The magnetic card according to claim 6 the second visible image is equivalent in meaning and different in shape to the first visible image.

10. The magnetic card according to claim 1, further comprising a second magnet layer of permanently magnetized material separate from the first magnet layer of magnetic material and located within the card between the first of the pair of opposing, major outer sides and the first magnet layer.

11. The magnetic card according to claim 10, further comprising a generally planar spacer located within the card between the first and second magnet layers physically separating the first and second magnet layers.

12. The magnetic card according to claim 1, further comprising a generally planar frame located within the card between the pair of opaque outer sides, the frame including at least one internal opening configured to receive at least a portion of the first magnet layer such that the frame and the first magnet layer are at least essentially coplanar.

13. The magnetic card according to claim 1 wherein the magnetically reproducible silhouette of the first magnet layer is different in shape from and yet equivalent in meaning to at least some portion of the first visible image.

14. The magnetic card according to claim 1 wherein the first predetermined configuration of permanent magnetization of the first magnet layer is complementary to the first visible image.

15. The magnetic card according to claim 1 having an outer perimeter and further including at least one depression located within the outer perimeter and extending at least through the first outer side and into a plane defined by the first magnet layer.

16. The magnetic card of claim 1 in the form of a puzzle defined by a plurality of individual planar card elements having mating edges, each card element bearing no more than a portion of a first visible image.

17. The magnetic card of claim 16 wherein the each of the individual card elements includes no more than a portion of the first magnet layer.

18. The magnetic card of claim 16 wherein mating edges of the plurality of individual card elements are non-linear.

19. The magnetic card of claim 16 wherein mating edges of the plurality of individual card elements are mutually interlocking.

20. The magnetic card according to claim 1 in combination with a magnetically actuated, fluid display panel formed a pair of spaced apart planar sheets and a plurality of magnetically attracted particles suspended in a fluid carrier between the sheets, the card being sized to fit directly on the panel on an exposed major side of one of the pair of sheets, the first magnet layer of the card generating a magnetic field effective to move the particles in the fluid carrier with the card positioned directly on the panel to reproduce the first silhouette.

21. The magnetic card according to claim 20 in which each of the pair of opposing major outer sides is more than eight square inches in area.

22. The magnetic card according to claim 21 wherein each side of the magnetic material of the first magnet layer is more than two square inches in area.

23. The magnetic card according to claim 1 wherein each side of the magnetic material of the first magnet layer is more than two square inches in area.

24. The magnetic card according to claim 1 wherein the magnetic material of the first magnet layer is a uniform composition and more than 0.005 in. thick.

25. The magnetic card according to claim 24 wherein the magnetic material of the first magnet layer is more than 0.010 in. thick.

26. The magnetic card according to claim 25 wherein the magnetic material of the first magnet layer is more than 0.015 in. thick.

27. The magnetic card according to claim 26 wherein the magnetic material of the first magnet layer has a thickness of 0.020 in. or more.

28. The magnetic card according to claim 1 wherein the magnetic flux density of the first magnet layer is less than 200 gauss on the first major outer side of the card.

29. The magnetic card according to claim 1 wherein the magnetic flux density of the first magnet layer is less than 150 gauss on the first major outer side of the card.

30. The magnetic card according to claim 1 wherein the magnetic flux density of the first magnet layer is 100 gauss or less on the first major outer side of the card.

31. The magnetic card according to claim 1 wherein the magnetic flux density of the first magnet layer is at least 200 gauss.

32. The magnetic card according to claim 1 wherein the magnetic flux density of the first magnet layer is at least 200 gauss at a remaining one of the pair of opposing major outer sides of the card.

33. The magnetic card according to claim 1 wherein the first silhouette, magnetically reproducible from the first magnet layer, has a shape selected from the group consisting of letters, numbers, symbols, characters, physical objects and combinations thereof.

34. The magnetic card according to claim 1 consisting essentially of the first magnet layer and another layer of cellulose based stock fixedly secured to one major side of the first magnet layer, the first magnet layer being coextensive in area and shape with the layer of cellulose based stock.

35. An integral magnetic card comprising a plurality of coadjoining generally planar layers, at least one of the plurality of layers being a first magnet layer, at least part of the first magnet layer being permanently magnetized material, at least one of the plurality of layers being opaque and overlying a major side of the first magnet layer and being exposed forming a first major outer side of the magnetic card, at least one of the plurality of layers bearing a first visible image on the first major outer side of the magnetic card, and the permanently magnetized part of the first magnet layer having a first magnetically reproducible silhouette other than rectangular in shape and different in appearance from the first visible image yet at least related in informational content to the first visible image.

36. An integral magnetic imaging card comprising:

a pair of opposing major outer sides;

a first visible image fixed on a first of the pair of opposing major outer sides; and a core underlying at least the first major side, the core including at least a first layer formed at least in part of magnetic sheet material, the magnetic sheet material of the first layer having a pair of opposing major sides, the magnetic sheet material being permanently magnetized in a fixed, predetermined, other than solid rectangular pattern in the first layer, the pattern having a magnetically reproducible, other than solid rectangular first silhouette, the fit silhouette being related at least in informational content to the first visible image on the first side of the card.

* * * * *